W. H. SCHROEDER.
SECTIONAL PNEUMATIC TIRE.
APPLICATION FILED SEPT. 28, 1921.
1,419,768.
Patented June 13, 1922.
2 SHEETS—SHEET 1.
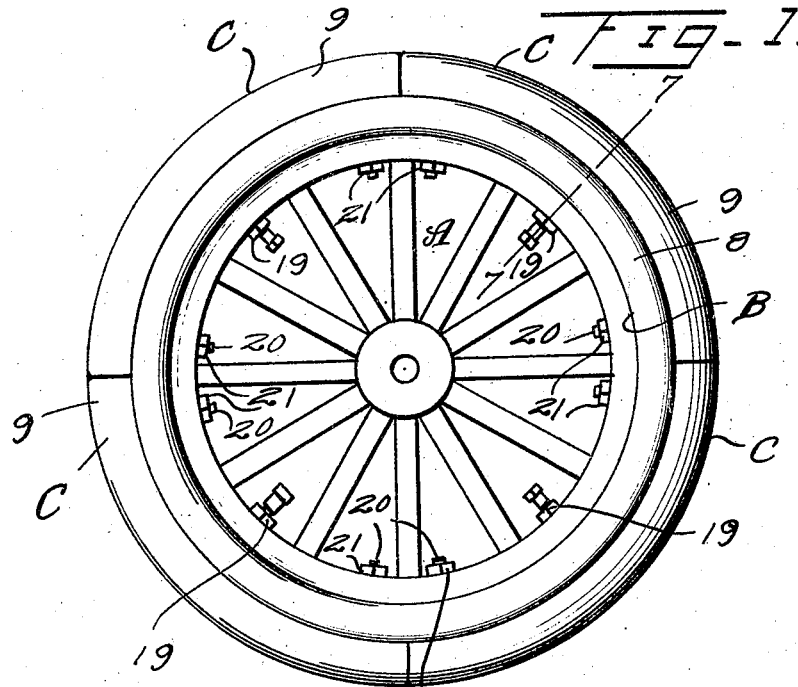
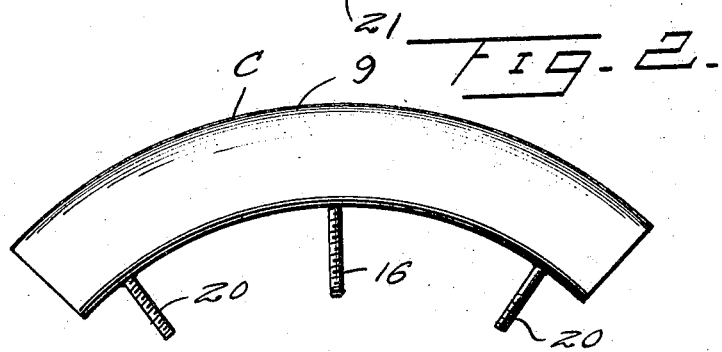
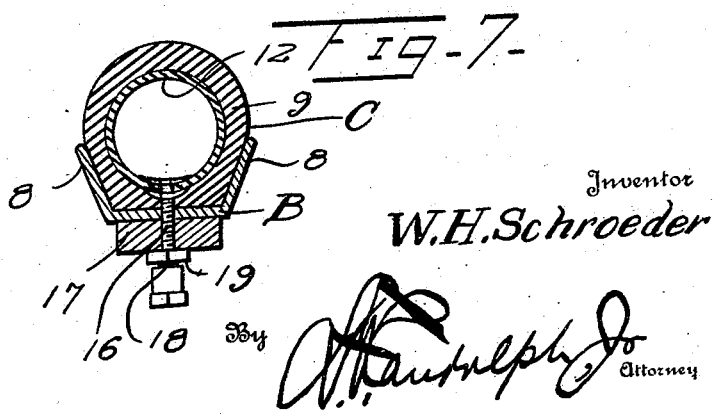
Inventor
W. H. Schroeder W. H. SCHROEDER.
SECTIONAL PNEUMATIC TIRE.
APPLICATION FILED SEPT. 28, 1921.
1,419,768.
Patented June 13, 1922.
2 SHEETS—SHEET 2.
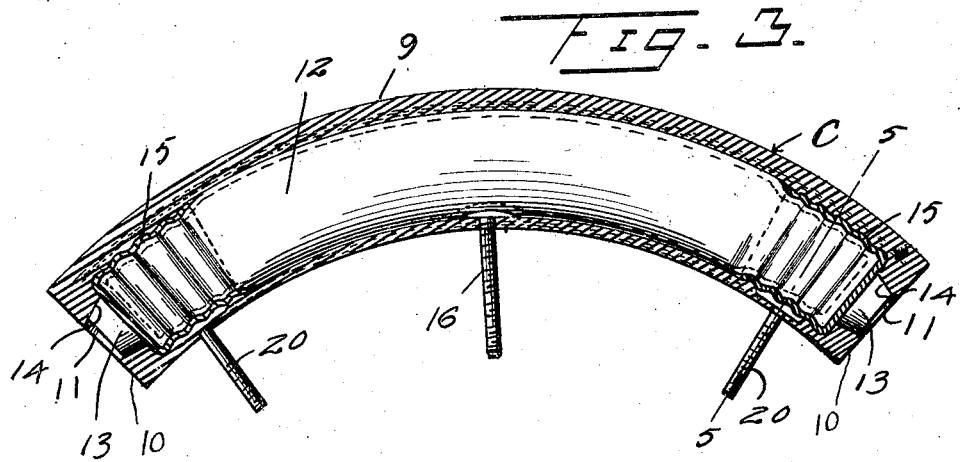
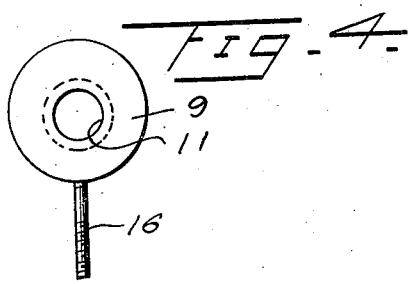
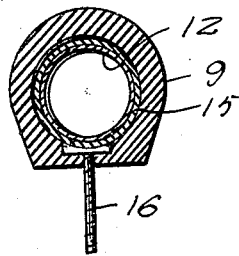
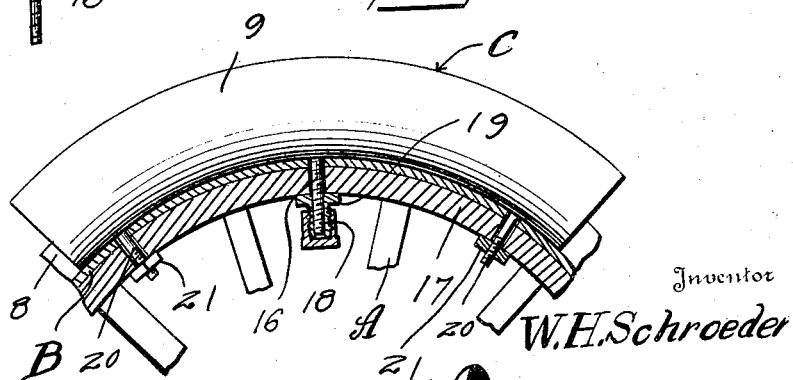
Inventor
W. H. Schroeder

UNITED STATES PATENT OFFICE.

WILLIAM H. SCHROEDER, OF EAST ORANGE, NEW JERSEY.

SECTIONAL PNEUMATIC TIRE.

1,419,768.

Specification of Letters Patent. Patented June 13, 1922.

Application filed September 28, 1921. Serial No. 503,742.

*To all whom it may concern:*

Be it known that I, WILLIAM H. SCHROEDER, a citizen of the United States, residing at East Orange, in the county of Essex and State of New Jersey, have invented certain new and useful Improvements in a Sectional Pneumatic Tire; and I do hereby declare the following to be a full, clear, and exact description of the invention, such as will enable others skilled in the art to which it appertains to make and use the same.

This invention relates to a pneumatic tire for vehicle wheels.

The main object is to provide such a tire in separable sections separately attachable to and detachable from a wheel so that the necessity of completely removing the wheel in the cases of bicycles and motorcycles is overcome, and in the case of an automobile, the employment of a lifting jack is unnecessary, whereby repair and replacement generally may be accomplished in less time, with less labor and work than is now required, and whereby one of the sections may be used as a "spare" instead of a complete tire.

A further object is to provide a pneumatic tire in sections separately attachable to and removable from a wheel by means of bolts, and which means have valves, inner tubes and end closing members held in place by inflation of the tube.

A further object is to provide a construction wherein the rim may be disposed in protecting relation to the said surface of the tire, to avoid unnecessary rough wear and stone bruises, than is possible with present constructions.

Additional objects and advantages will become apparent as the description hereinafter given is considered in connection with the accompanying drawing illustrating one practical embodiment.

In said drawings:—

Figure 1 is a side elevation of a wheel equipped with my improved tire;

Figure 2 is a side elevation of one of the tire sections alone;

Figure 3 is a longitudinal section through said sections;

Figure 4 is an end elevation of one of said sections;

Figure 5 is a detail cross sectional view on the line 5—5 of Figure 3;

Figure 6 is a side elevation of one of the sections and a fragment of the wheel rim, the latter being shown in sections to illustrate the notches of the fastening bolts therethrough, and Figure 7 is a cross sectional view through the wheel and tire taken on the line 7—7 of Figure 1.

Throughout the views, like reference characters designate like or similar parts.

The invention is shown in connection with a wheel A which is to be taken as conventional and of the type used for instance on bicycles, motorcycles and automobiles. A demountable or rigid rim, as preferred, is shown at B supported on the felly of the wheel A. The side flanges of the rim B are substantially straight and much wider than the usual retaining flanges of such rims in order to protect the exterior of the tire against rough usage and stone bruises to a greater degree, than is true in present devices. Said flanges are shown at 8.

The tire is made in a plurality of separable and independent sections C, the example shown consisting of four sections, but it being clear that any number desired may be employed.

Each section C has a shoe or casing 9, which is not split longitudinally as is the present practice, but which has end walls 10, provided with openings 11 therethrough. Each section C includes an inner tube 12 of the shape of the interior of the shoes 9 and closure disks 13 are provided to enter beveled seats 14 at the openings 11 under expansion or inflation of the tubes 12. Tubes 12 engage the closure disks 13 at their ends and at such points they are preferably reinforced by tubes or caps 15 of rubber or other resilient material similar to that of which the tubes 12 are constructed. Each section C has a valve stem 16 projecting outwardly from the tube 12 through the casing 9, the rim B, and the felly 17 of the wheel A. Beyond the felly 17, a fastening sleeve 18 is screw threaded onto the stem 16 and it has a base 19 to tightly engage the rim 17. The exterior of the member 18 is screw threaded, so as to receive a cap or the equivalent such as is used on tire tube valves generally.

Any suitable means may be utilized to secure the sections C to the wheel but as shown each casing 9 preferably has two bolts 20, one adjacent each end, secured thereto and projecting therefrom to pass through suitable openings in the rim B and felly 17 and beyond the same to receive fastening nuts 21.

In use, the sections C are fastened to the wheel by means of the bolts 20 and nuts 21 either before or after inflating tubes 12 through the valve or stem 16. Said tubes 12 while inflated, hold the closure disk 13 tightly against the seat 14 to prevent the entrance of foreign matter. The end walls 10 of the adjacent shoes 9 abut.

One of the sections C is preferably carried as a spare rather than a complete tire. In case of injury to one of the sections C, it can be removed by loosening the proper nuts 21 to remove the sections, replacing it with the spare. In the case of bicycles and motorcycles, this method of removal, replacement and repair of the tire, overcomes the necessity of completely detaching and removing the wheel. In the case of an automobile, if the hinged section C is lowermost, the wheel can be slightly rotated, so that one of the other sections will support the weight of the tire and dispose the inner sections in a position accessible for removal or replacement as described.

Particular attention is called to the fact that the flanges 8 are relatively wide and cover substantial side areas of the tire to protect the same against undue wear and stone bruises. This result is attained by reason of the fact that the shoes are not of the clincher type and are capable of removal by movement radially of the wheel.

As merely one preferred embodiment has been illustrated and described, it is to be understood that changes may be resorted to.

Having thus described the invention, what I claim is:—

1. A wheel tire made in separable sections for independent removal and replacement, said sections having contacting end walls, and inner tubes insertable to the sections through said end walls.

2. A pneumatic tire section having an end wall, said wall having an opening therethrough, and a pneumatic tube insertable through said opening.

3. A pneumatic tire section having an end wall, said wall having an opening therethrough, and a pneumatic tube insertable through said opening, and closure means for said openings maintained in place through inflation of said inner tube.

4. A pneumatic tire section having an end wall provided with an opening and a beveled seat thereat, a pneumatic tube insertable through said opening, and a closure disk to engage said seat through inflation of said pneumatic tube.

5. A pneumatic tire section having a shoe provided with end walls, said walls having openings therethrough, said openings having beveled seats thereat, disks having beveled walls to engage the seats, a pneumatic tube insertable into said shoe through either of said openings, reinforcing caps on each end of said tube to directly engage said closure disk, fastening bolts extending from said shoe one adjacent each end thereof.

In testimony whereof I affix my signature in presence of two witnesses.

WILLIAM H. SCHROEDER.

Witnesses:
STEPHEN L. EASTMAN,
WILLIAM FINK.